March 4, 1958 A. GUDMUNDSEN 2,825,196
POWER DRIVEN ROTARY DISC MOWER
Filed Dec. 27, 1954 6 Sheets-Sheet 1

INVENTOR.
AUSTIN GUDMUNDSEN
BY
Attorney

March 4, 1958

A. GUDMUNDSEN 2,825,196

POWER DRIVEN ROTARY DISC MOWER

Filed Dec. 27, 1954

INVENTOR.
AUSTIN GUDMUNDSEN
BY
Attorney

March 4, 1958

A. GUDMUNDSEN 2,825,196

POWER DRIVEN ROTARY DISC MOWER

Filed Dec. 27, 1954

INVENTOR.
AUSTIN GUDMUNDSEN
BY
Attorney

United States Patent Office 2,825,196
Patented Mar. 4, 1958

2,825,196

POWER DRIVEN ROTARY DISC MOWER

Austin Gudmundsen, Inglewood, Calif., assignor to Mc-Culloch Motors Corporation, Los Angeles, Calif., a corporation of Wisconsin Application December 27, 1954, Serial No. 477,633

15 Claims. (Cl. 56—25.4)

This invention relates to power lawn mowers, and is particularly concerned with improving the adaptability of lawn mowers to drive by an internal combustion engine, and to otherwise improve their efficiency and effectiveness, especially as to the avoidance of "scalping," i. e., engagement of the cutting rotor with the ground or obstacles.

The lawn mower of this invention employs twin horizontal rotors, and it is powered by a gasoline engine mounted on the frame of the mower, which drives the rotors through a belt. It features, among other things, support of the lawn mower frame from wheels so positioned in relation to the cutting rotors as to assure against the rotors engaging the ground even when the ground is rough or uneven. To this end the machine is supported from wheels positioned within the confines of hollow rotors which are provided with internal guard walls adapted to prevent the accumulation of cuttings within the hollow rotors by the action of centrifugal force in the cuttings.

It is an object of the invention to provide a lawn mower having a dome shaped cutter-supporting rotor in the general form of an inverted pan supported so that it may be rotated on a nearly vertical axis, there being a stationary guard within the rotor, which guard is also in the general form of an inverted pan having a peripheral wall which prevents accumulation of cuttings or other debris on the inner face of the peripheral wall of the rotor.

It is another object of the invention to improve and facilitate adjustments in a power driven mower as to the height of cut, and particularly that this may be done simply by turning a manual adjusting knob without entailing the use of tools or other manipulations.

It is another object of the invention to reduce or eliminate the hazard of breaking cutting elements in a power driven mower by providing elements which are held in cutting position under centrifugal force, enabling them to freely retract upon striking a solid object.

It is another object of the invention to avoid double cutting in a horizontal rotor type mower by having a rotor or rotors tilted slightly forward.

It is another object of the invention to avoid offset cuts in a twin rotor type mower by having the rotors tilted slightly away from each other, so that the cutting elements of the separate rotors move in planes which slope slightly downwardly toward each other, with the cutting elements passing each other in overlapping relationship.

It is still another object of the invention to improve the discharge of cuttings into a grass catcher by providing counter-rotating rotors which rotate toward each other and discharge cuttings rearwardly, a diverging channel being provided in the frame structure of the mower to facilitate the discharge of cuttings into a catcher at the rear of the machine.

A further object of the invention is to provide vanes on the counter-rotating rotors, which vanes will act upon the cuttings to lift and discharge the same rearwardly into a grass catcher.

A further object of the invention is to provide a lawn mower having dual counter-rotating rotors, and means arranged to motivate the lawn mower selectively in either of two opposite directions, so that the lawn mower may be employed in conjunction with a grass catcher to pick up cuttings, or when propelled in the opposite direction the cutters will act to repeatedly cut the cuttings and spread them as a mulch.

Further objects and numerous of the advantages of the invention will become apparent from the following description, detailed for the competence of disclosure and not for limitation of the invention set forth in the accompanying claims, and annexed drawings, wherein:

The mower has a main frame 13 which is of generally rectangular inverted pan form and combines the functions of support and cover for the driving mechanism. It defines with the sheet metal cover plate 11 a complete closure for a part of the mechanism. Underneath the frame 13, on each side, are skirt members 10 which are held in place by bolts 116. Near the rear edge thereof the cover plate 13 has an opening 13' which is covered by an adapter plate 14 arranged to support the power source of the mower, which in the present instance, is shown as an internal combustion engine E. At each side of the housing 13 are embossments or ribs 15 and 16 which form housings for the linkage connections to the rear wheel adjustments, as will be described. The ribs have upwardly extending lugs as shown at 17, to which are attached by pins 18' the extending arms of an operating handle as shown at 18. Numeral 20 designates the rear wheels of the machine, each of which is mounted on an axle which is vertically adjustable relative to the machine, the vertical adjustment being indicated by a pointer which will be described more in detail presently.

Figure 2:
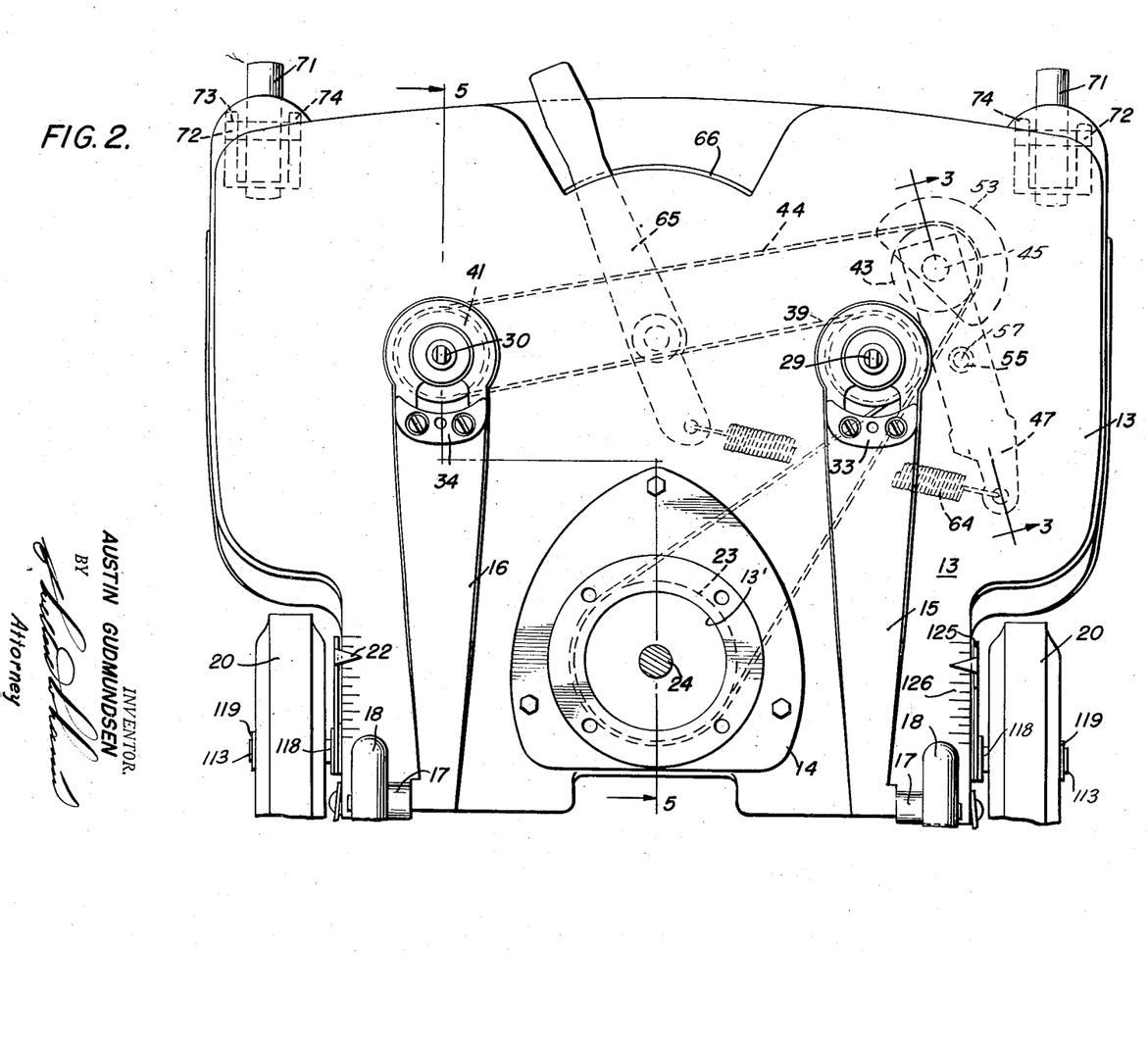
Fig. 2 is an enlarged plan view of the machine of the invention with adjusting knobs removed and showing the belt drive for the rotors in outline.
Figure 5:
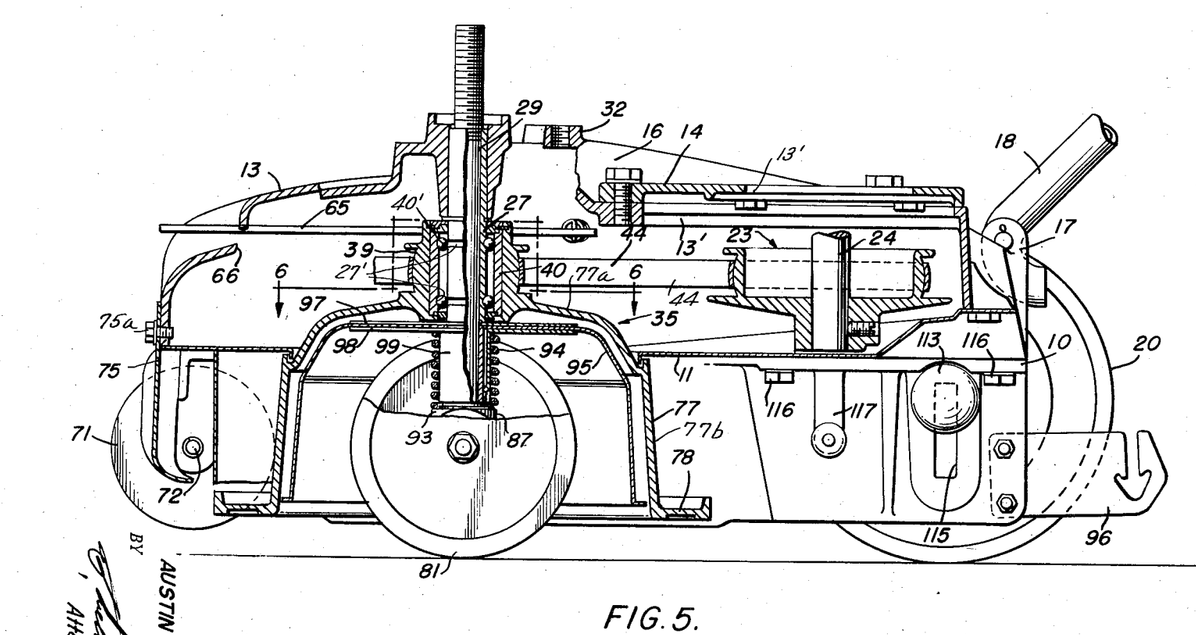
Fig. 5 is an enlarged partial sectional view taken along the line 5—5 of Fig. 2.

As shown in Fig. 5, the lower end 24 of the crankshaft of the engine E projects down through the opening 13' into the housing and has thereon a flanged drive pulley as shown at 23, adapted to have a belt 44 pass thereover. The pulley 23 is of conventional type and may be secured to the motor shaft in a conventional manner. The front ends of the ribs 15 and 16 terminate in circular bosses as shown at 25 and 26, and these bosses have central vertical bores 25' which receive the spindles of the cutting rotors which are substantially vertical but not quite, as will be described. The shafts or spindles for the cutting rotors are in the form of sleeves as shown at 27 in Fig. 5, and within these sleeves are shafts or stems, as shown at 29 and 30, to which are attached the front wheel supports 87 of the machine, and by which these wheels are adjusted vertically. Adjacent the bosses 25 and 26 are additional bosses indicated at 33 and 34, Fig. 2, which will be referred to again presently.

The pulleys that drive the rotary cutters are integral with the cutter rotors, an integral dome-shaped pulley and rotor assembly being indicated at 35, Fig. 5. The pulley part of the assembly is of conventional form as shown at 39, Fig. 5, and it has mounted within it a sleeve 40 cooperating with ballbearings 40' positioned in races 27' formed in this member and in the previously described sleeve member 27. The pulley and rotor assembly will be referred to again in detail presently.

Figure 1:
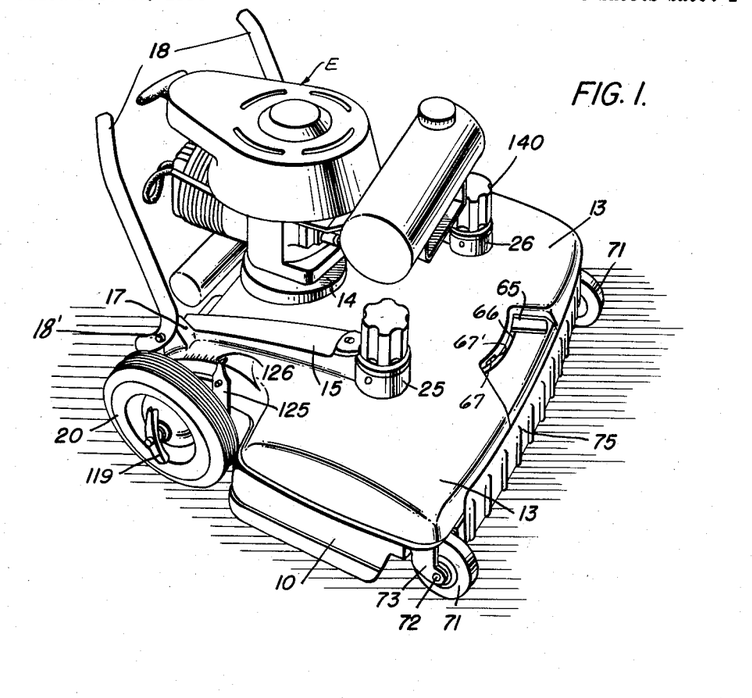
Fig. 1 is a perspective view of the machine of the invention.
Figure 3:
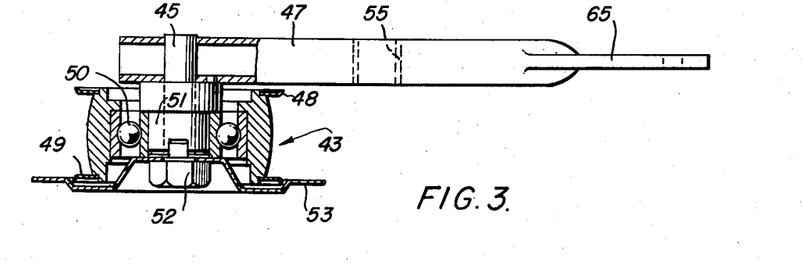
Fig. 3 is an enlarged detail sectional view taken along the line 3—3 of Fig. 2.
Figure 4:
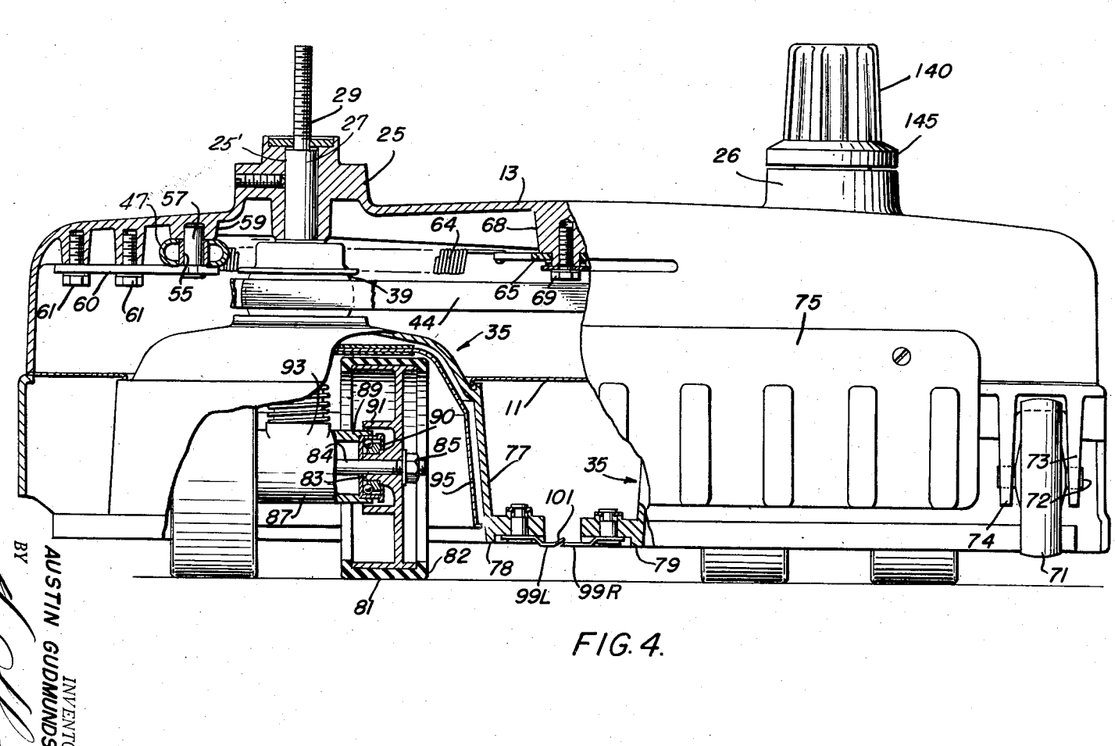
Fig. 4 is an enlarged front view of the machine with parts broken away and shown in section.

As previously pointed out, the pulleys for driving the rotors are belt-driven from the driving motor. Numeral 43 designates an idler pulley over which the driving belt 44 passes, in the manner shown in Fig. 2, the belt passing over the pulleys 39 and 41 in opposite directions so that the two rotors rotate toward each other, looking at the machine from the front. The idler pulley 43 is shown in detail in Fig. 3. The idler pulley 43 is rotatably mounted on a stem or axle 45 extending from a centrally pivoted adjusting lever 47. The pulley 43 has side flanges 48 and 49 and it has a ball bearing 50 interposed between itself and a bushing 51 on the axle or stem 45, the pulley being held onto the stem by a nut 52. The nut 52 also secures a protective shield 53 to the stem 45. This shield prevents the belt from coming off the pulley when it is slack. The lever or arm 47 is of tubular construction as shown in Figs. 3 and 4, and has a central bushing 55 adapted for pivotal mounting of the arm on a pin 57 engaged in a downwardly extending boss 59 at the top of the housing 13, as shown in Fig. 4. Support for the arm 47 is provided by plate 60 as shown in Fig. 4, which is attached to the housing 13 by bolts 61 as shown, the end of the plate 60 having attached thereto the pin 57 as shown. The end of the arm 47 opposite the idler pulley, has attached thereto a coil spring 64, the other end of which is attached to the inner end of a manual operating lever 65 which extends outwardly through a slot 66 in the housing 13 as shown in Figs. 1 and 5, the slot 66 having a wider offset portion 67 and a shoulder 67' at one end (Fig. 1) against which the lever can be latched when the lever 65 is swung leftwardly from the position in which it is shown in Fig. 1 into the notch or offset 67, creating tension in the spring 64 to make the belt 44 taut, so that driving power is transmitted to the rotors. The lever 65 is pivoted at an intermediate position on a downwardly extending boss 68 (Fig. 4) extending from the housing 13, and is held in position by a bolt 69 and washers, as shown.

Numeral 71 designates front bumper wheels of the machine, there being one of these at each side of the machine at the front. These wheels do not normally engage the ground as will be described presently, but serve to facilitate moving the machine over obstructions which it may encounter. The front wheels 71 are mounted on horizontal axles 72 engaged between bracket members 73 and 74 which extend downwardly from the front portions of the side frames 13. A front shield 75 is attached to housing 13 by screws 75a as shown in Fig. 5.

Referring now more particularly to Fig. 5 of the drawings, the structure of the rotor assemblies will be described in greater detail, and also the wheel support of the forward part of the machine. The rotor assemblies 35 include integral dome shaped members or portions 77, at the lower part of which are horizontally extending flange or rim portions 78. These rims or rim portions carry the cutting elements, as will presently be described. Each member 77 includes a top wall 77a and a ring shaped wall 77b which is approximately cylindrical.

A feature of this invention is that the front wheel supports of the machine are from the substantially vertical shafts or stems 29 and 30. Thus, the centers of support of the machine are at the centers of the cutting rotors, so that "scalping," that is, engagement of the rotors with rough or uneven ground, is eliminated. The dome shaped members 77 permit the supporting wheels to have substantial diameter. The wheels for each of the rotor assemblies is in the form of a pair, one of the wheels for one of the pairs being indicated at 81 in Figs. 4 and 5. As shown, the wheel has a relatively broad rim 82, and a hub 83, engaged on a shaft 84 on which is also engaged the opposite wheel of the assembly. The wheel is secured by a nut 85 on the end of the shaft 84. The wheel 81 and its corresponding wheel, are carried by a wheel support or fitting 87 attached to the end of stem 29. The member or fitting 87 has horizontally extending hubs, one of which is shown at 89, and the end of which supports a roller bearing as shown at 90, between itself and the central hub 83 of the wheel 81. The wheel 81 has an inwardly extending annular flange 91, as shown, spaced from the cenetr hub 83. The member or fitting 87 has an upwardly extending portion 93 which rigidly engages the end of the stem 29. Numeral 95 designates a non-rotary dome shaped shield within member 77. It may be made of fibre glass and its purpose is to prevent the accumulation of grass cuttings within member 77 which would otherwise occur due to centrifugal force. Member 95 extends between discs, a disc 98, which is secured to the upper end of a cylindrical part 99' and a disc 97 which engages the lower end of the sleeve 27, in surrounding relation to the lower end of the stem 29. The wheel assemblies are vertically adjustable relative to the frame of the machine by vertically adjusting the stems 29 and 30 by means of manually adjustable knobs, as will be described presently; that is, by adjusting the stem 29 relative to the frame of the machine, the position of the wheel assembly can be adjusetd to effect raising and lowering the mower and its cutters relative to the ground as will be described, for varying the height of cut which is taken. A coil spring 94 is provided around cylindrical part 99' and between the wheel support 87 and disc 98 to urge the disc 98 upwardly and hold the disc 97 against the lower end of the sleeve 27 and thereby maintain the shield 95 raised within the dome-shaped member 77 independently of whether the wheel support 87 may be adjusted downwardly from the position in which it is shown in Fig. 5.

Figure 6:
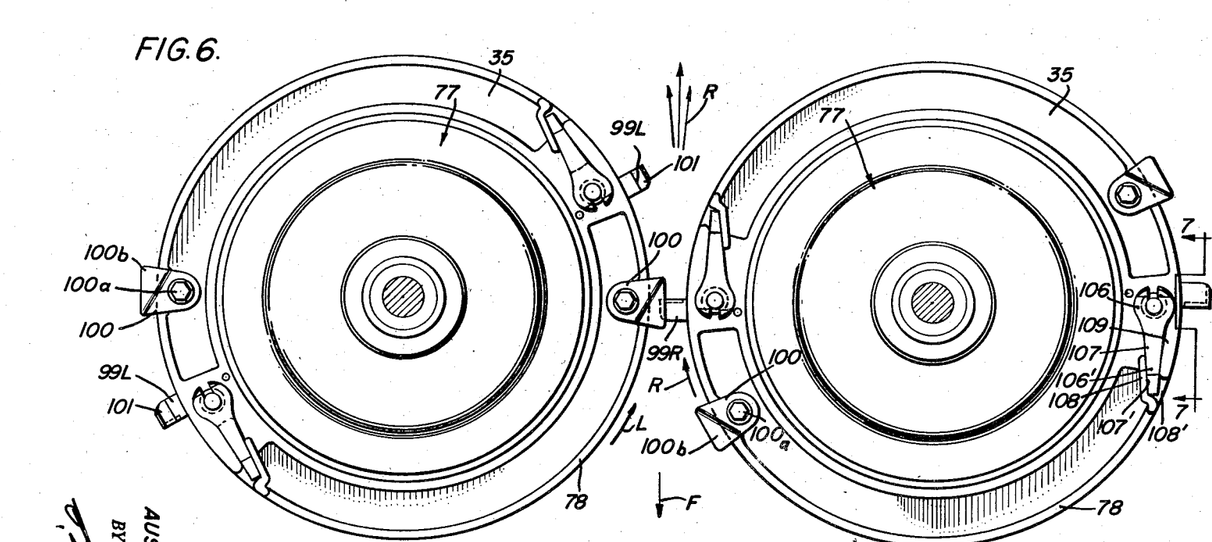
Fig. 6 is an enlarged view looking down upon the two rotors of the mower from the plane indicated by the line 6—6 of Fig. 5.

In Fig. 6 the rotor assemblies 35 are shown in the side-by-side position which they occupy. They are rotated in the opposite directions indicated by the arrows R and L. If the mower is moved forwardly during the grass cutting operation, as indicated by the arrow F, cutters 99 which project radially from the flanges 78, and the accompanying flingers 100 which are likewise mounted upon the flanges 78 in radially projecting positions, will carry the grass cuttings in the directions indicated generally by the arrows R and L and will eject these cuttings rearwardly, as indicated by the arrows R' in a comparatively narrow stream so that they may be received by a grass catcher adapted to be hooked onto brackets 96 which project rearwardly from the mower shell. If the handle 18 is swung rightwardly from the position in which it is shown in Fig. 1 so as to project forwardly from the mower, the handle 18 may be employed to propel the mower in reverse direction. Then, the cutters 99R and 99L which engage the grass to be cut will be moving laterally, away from the center of the mower and will spread the cuttings laterally upon the cut lawn.

Each of the rotors has two cutting blades 99 identified respectively as cutters 99R and cutters 99L for the reason that there is a slight difference between them for the purpose of avoiding interference between the cutters 99R and 99L should they pass simultaneously through the space between the rotors 35 as shown in Fig. 4. The blades 99R are straight and extend horizontally, but the blades 99L have toe portions 101 bent up diagonally as shown in Fig. 4 so as to overlap the ends of the blades 99R when blades in the righthand rotor 35 are in conjunction with the blades on the lefthand rotor 35.

Figure 7:
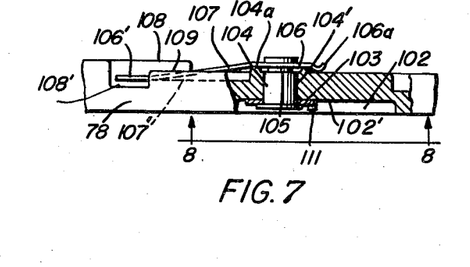
Fig. 7 is an enlarged fragmentary sectional view taken as indicated by the line 7—7 of Fig. 6.
Figure 8:
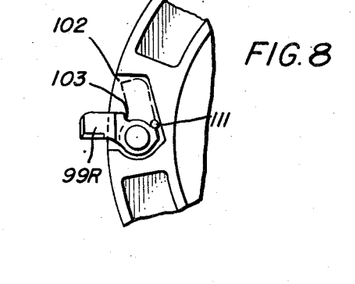
Fig. 8 is a bottom plan view, drawn to the same scale as Fig. 6, looking upwardly from the plane indicated by the line 8—8 of Fig. 7.

As shown in Figs. 4, 7 and 8, the flanges 78 of the rotors 35 have in the lower faces thereof depressions 102 to receive the bodies 103 of the blades 99 which are rotatably supported on pins 104 which extend through openings 104' in the flanges 78 of the rotors 35. The upper end of each pin 104 has therein a circumferential channel 105 arranged to be engaged by the slotted end 106 of a key 107 made from flat spring metal with a handle portion 106' extending downwardly at a slight angle as shown in Fig. 7, so that a portion thereof will extend in a channel 107' formed in the upper face of the flange 78 between walls 108 and 109. The key 107 will not be dislodged from the position in which it is shown in full lines in Figs. 6 and 7 during the ordinary operation of the mower, but removal of the key 107 so as to release the pin 104 can be effected by lifting the outer end of the handle 106' and then rotating the same outwardly, whereupon the key 107 may be pulled laterally out of engagement with the channel 105 in the pin 104. A radially directed depression as shown at 108' in Fig. 7 permits the insertion of a tool, such as the point of a screw driver, under the extremity of the handle 106' to pry the same upwardly and lift it from the channel or slot 107' in which it rests.

As further shown in Fig. 7 there is a circular rib 104a around the upper end of the opening 104' against which a portion of the key 107 rests. Also, the extremity of the slotted portion 106 of the key 107 has a downwardly bent portion 106a providing a spring detent for the key 107 extending downwardly adjacent a portion of the circular rib 104a, to hold the key 107 in place, but being yieldable under the application of suitable pulling force to the key 107. The key, being bent in the manner shown acts as a spring to continuously lift the pin and thereby hold the body 103 of the blade 99 tightly against the horizontal face 102' of the depression 102, to provide sufficient friction between the blade 99 and the parts adjacent thereto to prevent a flapping action of the blade which would occur if the blade were loosely supported by the pin 104. The flingers 100 each comprise a flat metal plate secured to a flange 78 by means of a machine screw 100a and having a tip portion 100b bent upwardly at an angle of 15° to 25°.

Each blade or cutter 99 is mounted so that its center of gravity is spaced from its center of pivotal movement. Thus, as the rotors 77, rotate, the cutters move outwardly into cutting position under the effect of centrifugal force. If the cutter members strike or engage a solid object such as a rock, or the stem of a tree or plant, the cutters may swing back into retracted position within the depression 102 without being damaged or broken off. Thus, the need for replacing broken or damaged cutters is greatly reduced. When a cutter 99 retracts back into the depression 102, it engages a stop pin 111. The rotors 35 are mounted so that they have a slight tilt toward each other, that is to say, with the upper ends of their nearly vertical axes of rotation are closer at the top than at the bottom, which results in no offset cuts, that is, adjacent cuts of slightly different height. Also, these rotors 35 are mounted to have a slight forward tilt so that there is no double cutting; that is, the cut is made at the front of the rotors and there is no cutting at the rear of the rotors. The angle of tilt of the rotor shafts is very small and is not visible on the drawings.

Figure 9:
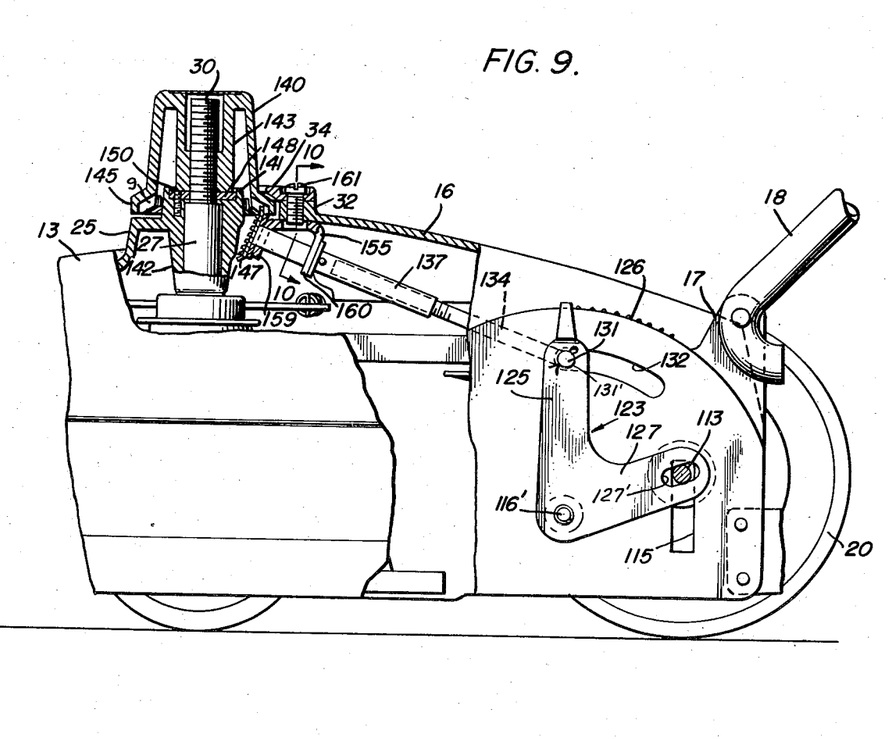
Fig. 9 is a combined view to enlarged scale and with parts broken away showing the manual adjustment of the front wheel support of the mower in section, and showing a partial side view of the rear of the mower to display the rear wheel adjustment.

The invention provides for adjustable vertical mounting of the rear wheels simultaneously with vertical adjustment of the forward wheel assemblies. In other words, to provide for cuts of different height, the entire chassis or frame of the machine with the rotor assemblies, is adjusted relative to the wheels. In Fig. 9, the axle for one of the rear wheels 20 is shown as the bolt 113, which carries a bushing 118 (Fig. 2), and has wing nut 119 at its outer end (see Fig. 1), whereby the bolt through the bushing 118 and the washers at its ends may be tightened in the slot 115 and loosened for vertical adjustment. A bell-crank lever 123 is pivoted on a pivot pin 116' journalled in the rib 117 and having one arm 125 in the form of an indicating pointer, the end of which is bent over and moves adjacent a graduated scale 126, formed on the housing 13 to indicate the vertical position of the rear wheel 20. The bell-crank lever 123 has a second arm 127 having a slightly elongated opening 127' which engages the axle 113 of the rear wheel 20 adjacent to the frame 13. Thus, it can be seen that when the wing nut 119 is loosened so as to loosen the axle bolt 113 relative to the slot 115, by rotating the bell-crank lever 123 about its pivot, the rear wheel 20 can be adjusted vertically and set relative to the frame 13.

Figure 10:
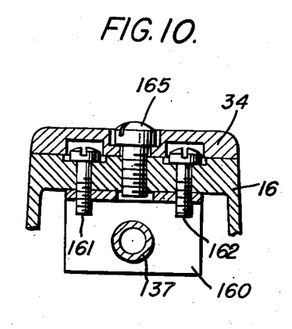
Fig. 10 is an enlarged detail section view taken along line 10—10 of Fig. 9.

A link 134, which is threaded into a tubular member 137, has a laterally extending portion 131 which extends through an arcuate slot 132 in the housing 13 and engages a hole 131' near the upper end of the bell crank arm 125. As will be seen in Fig. 9, the boss 25 has an upwardly extending portion 141 of smaller diameter, and it has a downwardly extending boss 142 which holds the sleeve 27. Each manual adjusting knob 140 has an internal boss 143 which engages the end of the stem 30 in screw-threaded relationship. At its lower part the knob 140 has a flared skirt 145 which has bevel gear teeth g engageable with a smaller bevel gear 147 which is fixed on the leftward end of the tubular member 137. The upwardly extending boss 141 has a counterbore as shown, which receives a thrust disc 148 disposed adjacent the internal boss 143 of knob 140, and this disc is secured to boss 141 by a pin 150. The stems 29 and 30 have flats on opposite sides, and the opening through disc 148 has corresponding flats, so that the disc which is fixed prevents rotation of the stem passing through it. The stems 137 are supported and journalled in bracket members 155, having legs as shown at 159 and 160. Each bracket 155 is attached to the under side of a rib 16 adjacent a knob 140 by bolts 161 and 162, as may be seen in Fig. 10. The heads of those bolts are covered by the arcuate cap member 34 which is attached to the rib 16 by a bolt 165 adjacent the knob 140, as may be seen in Figs. 9 and 10.

From the foregoing, the operation of the parts just described will be understood by those skilled in the art. Adjustment of the knob 140, in addition to adjusting the front wheel assembly relative to the frame, adjusts the vertical positioning of each rear wheel through the bevel gear 147 and the connections to the bell-crank lever 123. When an adjustment is to be made, the wing nut 119 is loosened so as to loosen the axle bolt 113 in the slot 115. When the knob 140 is then turned in a counterclockwise direction, for example, it rotates the bevel gear 147 in a direction to unscrew the member 137 relative to the stem 134, and to thus extend these parts. This moves the bell-crank lever 123 in a counterclockwise direction, the pin 131 moving to the left in slot 132. Arm 127 moves downwardly, moving axle 113 and wheel 20 downwardly relative to slot 115. The arm or pointer 125 has its extending tip moving adjacent graduations on the housing 13 as shown in Figs. 1 and 9 to indicate the height of cut established by the adjustment. After the adjustment is made, the wing nut 119 is re-tightened. From the foregoing it can be observed that a cut of any desired height can be made simply by adjusting the knob 140 and the other corresponding knob, and observing the indicating pointers relative to the graduations on the housing 13.

I claim:

1. In apparatus of the character described, in combination: a frame having supporting wheels; means comprising a substantially vertical shaft mounted in said frame; a rotor member mounted on said shaft having a ring shaped wall; peripheral cutting means on said ring shaped wall of said rotor member; power means for rotating said member; a stationary ring shaped guard member within said ring member and covering the inner face thereof so that debris is prevented from accumulating on the inner face of said ring shaped wall; and a supporting wheel mounted within said ring shaped guard member.

2. In a lawn mower, in combination: a frame having supporting wheels; a substantially vertical shaft mounted in said frame; a dome-shaped rotor member carried by said shaft; peripheral cutting means on said rotor member; means for rotating said member; a stationary dome-shaped guard member within said rotor member and covering the inner face of said rotor member so that debris is prevented from accumulating thereon; and a supporting wheel carried within said dome-shaped guard member and having engagement with said shaft.

3. In a lawn mower, in combination: a frame having supporting wheels; a substantially vertical shaft mounted in said frame; a rotor member carried by the shaft including a circular wall; peripheral cutting means on said rotor member; driving means for rotating said member; and a stationary hollow guard member within said rotor member having a circular guard wall covering inner face of the said circular wall of said rotor member so that debris is prevented from accumulating on the inner face of said circular wall.

4. In a lawn mower, in combination: a frame having supporting wheels; a pair of laterally spaced substantially vertical shafts mounted in said frame; a dome-shaped rotor member rotatably carried by each of said shafts; motor drive means for rotating said members; and a supporting wheel mounted within each of said rotor members, the rotor members being arranged for counter-rotation and each having cutting elements attached thereto, the cutting elements on the rotors having blades lying in the same horizontal plane, with the end of the blade on one rotor being offset vertically so as to pass the end of a blade on the other rotor in overlapping relationship.

5. In a lawn mower, in combination: a frame having supporting wheels; a pair of laterally spaced substantially vertical shafts mounted in said frame; and a circular rotor member rotatably mounted on the lower end of each of said shafts, each of said rotor members having cutting elements attached thereto, and said rotor members being mounted to have a slight tilt toward each other.

6. The structure of claim 5, wherein each of the rotors also has a continuous slight forward tilt.

7. In apparatus of the character described, in combination: a frame having supporting wheels; a substantially vertical shaft mounted in said frame; a dome shaped rotor member having cutters carried by said shaft; means for driving the rotor; and a non-rotary dome shaped guard member mounted within and adjacent the dome shaped rotor member.

8. In a lawn mower: a frame; a pair of rotors rotatably supported under the frame in side-by-side relation each of said rotors comprising an upper wall and an approximately cylindrical wall extending downwardly from said upper wall, said rotors defining between them a space having a vertical dimension determined by the height of said approximately cylindrical wall; power means for rotating said rotors in opposite directions; pivot means on the peripheral portions of said rotors; cutting blades supported on said pivot means so as to be swung outwardly by centrifugal force into radially extending cutting positions when said rotors are revolved; and impellers for cuttings mounted on said rotors in radially projecting relation whereby the cuttings will be carried through and thrown as a stream from the space between said rotors.

9. A mower as defined in claim 8 having a handle and means connecting said handle to said frame so that it may be swung from front to rear whereby the mower may be moved by the handle in two different directions, one wherein the cuttings will be discharged as a stream from between said rotors and the other direction wherein the cuttings will be spread laterally and in part rearwardly from the opposite side portions of the rotors.

10. In a lawn mower: a frame; a pair of rotors rotatably supported under the frame in side-by-side relation; power means for rotating said rotors in opposite directions; pivot means on the peripheral portions of said rotors; and cutting blades supported on said pivot means so as to be swung outwardly by centrifugal force into radially extending cutting positions approximately in a common horizontal plane when said rotors are revolved, the path of circular movement of the ends of the blades on one of said rotors overlapping the path of circular movement of the ends of the blades on the other of said rotors, and the ends of the blades on one of said rotors being offset vertically to miss the blades on the other of said rotors.

11. In a lawn mower: a frame; a pair of rotors rotatably supported under the frame in side-by-side relation, each of said rotors having a circular flange with a pin opening therethrough; pins extended through said openings, each of said pins having a head on one end thereof; cutting blades mounted on said pins adjacent said heads; and spring means urging said pins in a direction to move said heads toward said blades thereon whereby said blades will be frictionally engaged and thereby prevented from swinging freely on said pins.

12. A device as defined in claim 11 wherein said pins have slots near their ends opposite from said heads and said spring means engage said slots and also lock said pins in operative positions in said openings in said flange.

13. A device as defined in claim 12 wherein said spring means each comprises a flat metal plate having a forked portion to engage the slot in said pin, and a handle portion arranged to engage a shoulder on the flange through which the pin passes and to be thereby retained in pin-locking position.

14. In a lawn mower: a frame; a pair of substantially vertical shafts mounted in said frame in side by side relation; a pair of circular rotor members connected respectively to said shafts; lawn cutters on said rotor members; motor means for rotating said rotor members; vertically adjustable frame supporting wheels on said frame spaced from said rotors; and vertically adjustable supporting wheels connected respectively to the lower ends of said shafts within said circular rotor members for continuously engaging the turf and cooperating with said first named wheels to support said frame and said rotor members in spaced relation to the ground.

15. In a lawn mower: a frame having laterally spaced and vertically adjustable supporting wheels; a pair of substantially vertical shafts mounted in said frame in side by side relation and spaced from said supporting wheels; a pair of dome shaped members respectively supported by said shafts for rotation in positions below said frame; motor drive means for rotating said rotor members; lawn cutters on the lower portions of said rotor members; and stationary annular guard members respectively supported within said rotor members and covering the inner faces thereof so that debris is prevented from accumulating on the inner faces of said rotor members.

References Cited in the file of this patent

UNITED STATES PATENTS 2,522,112     Gilmour ______________ Sept. 12, 1950

(Other references on following page)

UNITED STATES PATENTS

| | | |
|---|---|---|
| 2,530,684 | Davis | Nov. 21, 1950 |
| 2,561,293 | Ross | July 17, 1951 |
| 2,568,822 | Pervis | Sept. 25, 1951 |
| 2,569,682 | Lewis | Oct. 2, 1951 |
| 2,606,416 | Bruner | Aug. 12, 1952 |
| 2,633,688 | Yech et al. | Apr. 7, 1953 |
| 2,669,826 | Watrous | Feb. 23, 1954 |
| 2,669,827 | Brownlee | Feb. 23, 1954 |
| 2,671,299 | Orr | Mar. 9, 1954 |
| 2,681,536 | Kuhary et al. | June 22, 1954 |
| 2,682,142 | Clark | June 29, 1954 |
| 2,688,833 | Weiss et al. | Sept. 14, 1954 |
| 2,734,326 | Gebhart | Feb. 14, 1956 |